United States Patent
Yorde

[19]

[11] Patent Number: 6,062,574
[45] Date of Patent: May 16, 2000

[54] TOOL BIT HOLDER

[76] Inventor: Rick Yorde, 19660 Baker Rd., Gambier, Ill. 43022

[21] Appl. No.: 09/129,153

[22] Filed: Aug. 5, 1998

[51] Int. Cl.$^7$ .................................................... B23B 31/20
[52] U.S. Cl. .............................. 279/49; 279/46.3; 279/54; 408/240
[58] Field of Search ................................ 279/49, 54, 55, 279/56, 57, 46.2, 46.3, 48; 408/240

[56] References Cited

U.S. PATENT DOCUMENTS

| | | | |
|---|---|---|---|
| 2,176,071 | 10/1939 | Hall | 279/54 |
| 2,211,216 | 8/1940 | Oster | 279/49 |

FOREIGN PATENT DOCUMENTS

| | | | |
|---|---|---|---|
| 137530 | 10/1952 | Sweden | 279/49 |
| 996557 | 6/1965 | United Kingdom | 279/49 |

*Primary Examiner*—Steven C. Bishop
*Attorney, Agent, or Firm*—Dillis V. Allen, Esq.

[57] ABSTRACT

A tool bit holder having a collet nut engageable with a rotary and/or reciprocating output shaft having a hollow free end with a collet, having jaws with respective head and shank portions, disposed in the hollow interior of the collet nut and an annular expansion insert member having an aperture of a diameter greater than the diameter of the hollow free end of the tool output shaft through which the shank portion of the collet jaws extend, with the expansion insert member having a proximal end engageable with the free end of the output shaft and a distal end engageable with the heads of the collet jaws, provides improved capacity for the tool bit holder to accommodate a greater range of tool bit sizes.

26 Claims, 6 Drawing Sheets

TOOL BIT HOLDER

FIELD OF THE INVENTION

The present invention pertains to tool bit holders, and more particularly pertains to collet type tool bit holders for attachment to an output shaft.

BACKGROUND OF THE INVENTION

Current structures for detachably securing tool bits to an output shaft of a device, such as the rotary output shaft of a power tool, are generally one of two types; namely, collet types which utilize a collet having integral, resilient jaw members to secure a tool, and chuck types which utilize a plurality of separate, sliding jaw members to secure a tool. However, each of these two types of currently existing tool bit holders has significant shortcomings.

Namely, those of the collet type are quite limiting in the range of tool bit shaft diameters which they can receive or accommodate, but are, however, relatively inexpensive to produce and relatively simple in construction. Those of the chuck type can accommodate a significantly wider range of tool bit shaft diameters, but are, however, relatively expensive to produce and relatively complex in construction. The relative complexity of construction of chuck-type structures results in unacceptably frequent malfunction of chuck type structures, such as due to debris interfering the springs utilized to bias the separate clamping jaw members, or interference of the sliding movement required of the separate clamping jaw members.

Accordingly, there remains a need for a tool bit holder suitable for attachment to the rotary output shafts of small, power-driven devices which can accommodate the wide range of tool bit sizes associated with chuck-type structures, and which also has the greater reliability and lower cost of production associated with collet-type structures. Also, there remains a need for a collet type tool bit holder which can accommodate a wider range of tool bit shaft diameters, without the requirement of interchanging one or more components of the tool holder, such as changing between two or more collets, than is obtainable with currently existing collet-type tool holders.

SUMMARY OF THE INVENTION

In accordance with the present invention, a tool bit holder is provided for use with a tool having a rotatable output shaft with a proximal end and a distal end, the output shaft having a hollow portion of predetermined diameter adjacent its distal end, and having a threaded portion, with the tool holder comprising a collet nut having a threaded portion for threaded engagement with the threaded portion of the tool output shaft, and having a hollow interior at least a portion of which is of greater diameter than the predetermined diameter of the hollow portion of the output shaft, and having an interiorly disposed camming surface, and having a collet disposed in said hollow interior portion of the collet nut and having a plurality of radially disposed resilient jaws each having a head portion and a shank portion, with the head portions having a first camming surface for camming engagement with the interiorly disposed camming surface of the collet nut, and the head portions having a second camming surface, and with the shank portions having a common free end which is receivable in the output shaft hollow portion; and an annular expansion insert member disposed in said hollow interior of the collet nut and having an aperture of predetermined diameter through which the shank portions of the collet pass, the expansion insert member having a proximal end for bearing against the distal end of the tool output shaft, and having a distal end for bearing against the second camming surfaces of the head portions of the collet nut.

BRIEF DESCRIPTION OF THE DRAWINGS

In the drawings, wherein like elements are referenced alike.

DETAILED DESCRIPTION OF THE PREFERRED EMBODIMENT(S)

A tool bit holder embodying various features of the present invention is illustrated in FIG. 1 and FIGS. 5–8 and referred to generally by reference numeral 20. The illustrated tool bit holder 20 has a collet nut 22 with a hollow interior portion 24 in which an integral clamping sleeve or collet 26 is disposed. The collet 26 has a plurality of slits 28 which define a plurality of radially disposed, resilient jaws 30 each having a head portion 32 and a shank portion 34. The shank portions 34 of the collet 26 are received though the central aperture 36 of an annular expansion insert member 38. With the collet nut 22 engaged with the rotatable output shaft 40 of a power tool, the proximal end 42 of the expansion insert member bears against the distal end 44 of the output shaft 40, and the distal end 46 of the expansions insert member 38 bears against the lower camming surfaces 48 of the head portions 32 of the jaws 30, whereby the insert member 38 maintains spacing between the head portions 32 of the jaws 30 of the collet 26 and the distal end 44 of the power tool output shaft 40.

As discussed in greater detail below, the expansion insert member 38 of the present invention in the tool bit holder 20 allows for the tool bit holder to accommodate a significantly greater range of tool bit sizes utilizing an integral collet 26 than prior art tool holders utilizing an integral collet. Hence, by way of example, a single tool bit holder 20 of the present invention can readily secure tool bits having diameters ranging from nearly zero inch up to and including ⅛ inch, without the requirement of changing between two or more collets.

Figures 2, 3:
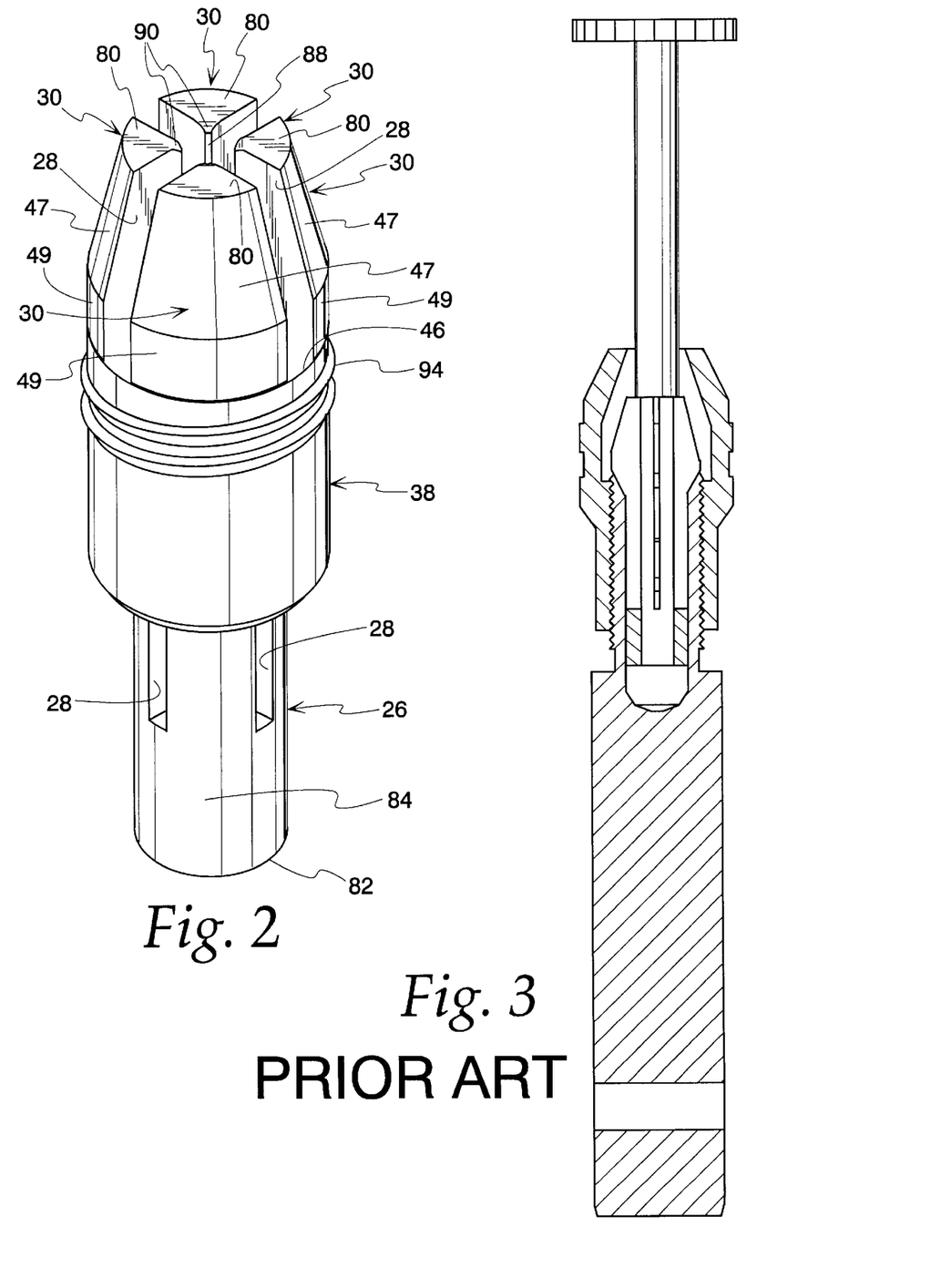
FIG. 2 is a an enlarged perspective view of the collet and expansion insert member of the tool bit holder of FIG. 1.
FIG. 3 is a sectional view of a prior art collet-type device illustrating the limitation of opening ability of a collet suitable for securing small diameter tool bits in such prior art collet-type devices, and the inability of such prior art collet-type devices to secure a tool bit of greater diameter than the diameter of the bore in the free end of the collet.
Figure 4:
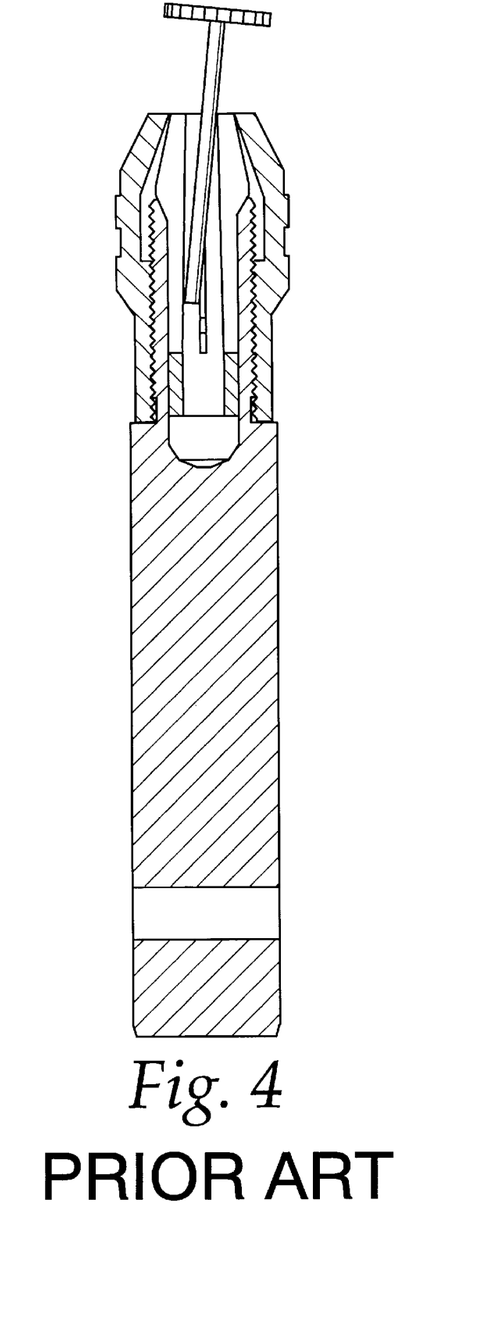
FIG. 4 is a sectional view of a prior art collet-type device illustrating the inability of larger collets which are suitable for securing relatively large diameter tool bits to also secure relatively small diameter tool bits.

By way of explaining some of the advantages afforded by the tool bit holder 20 of the present invention over prior art tool holders, FIGS. 3 and 4 illustrate a prior art tool holder of the type utilizing a conventional collet and collet nut. In such prior art devices, the entire lower, shank portion of the collet is slidably received into the hollow opening at the distal end of the power tool output shaft. Abutment of the lower surface of the heads of the collet jaws against the angled free or distal end of the drive shaft limits the extent of sliding of the collet into the drive shaft. As best seen in FIG. 3, the extent of opening of the collet jaws, or radially outward movement of the resilient jaws, is limited in such prior art tool bit holders by the close tolerance between the outer surface of the collet shank and the interior surface defined by the aperture in the distal end of the output shaft, which close tolerance extends along the entire length of the shank. That is, the shank portion of the collet immediately adjacent the head portion is disposed in the bore of the drive shaft, and outward movement or opening of the head portions of the collet is limited by abutment of that shank portion of the collet which is immediately adjacent the head portion of the collet against the interior wall of the power tool output shaft. FIG. 3 illustrates the inability of the prior art tool holder, having a collet which is sufficiently small to tighten down small diameter tool bits, to also receive relatively large diameter tool bits. FIG. 4 illustrates the inability of the prior art tool holder, having a collet which is sufficiently large to receive relatively large diameter tool bits, to also tighten down relatively small diameter tools. The tool holder of the present invention can receive and tighten down tool bits having either relatively large diameters or small diameters, without the requirement of having to change between two of more different collets.

Figure 5:
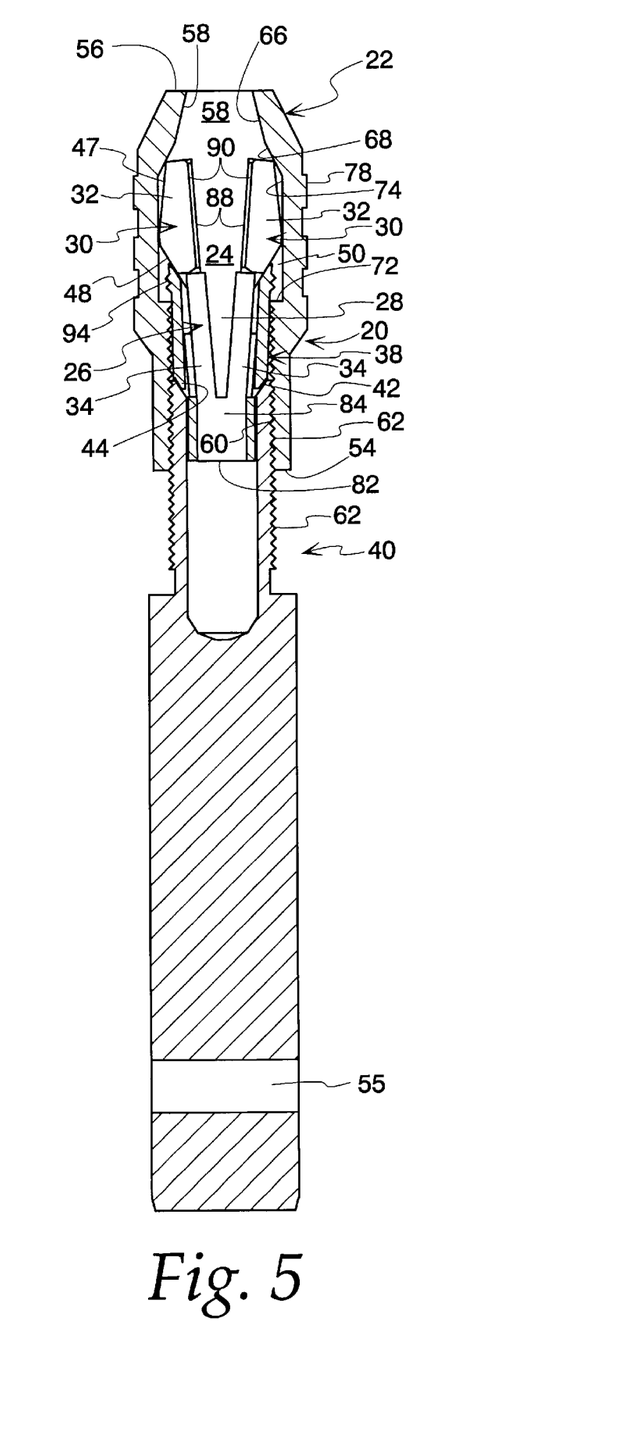
FIG. 5 is a sectional view of the tool bit holder of the present invention shown in its fully open position, illustrating the significantly wider opening of the collet which is realized by employment of the insert member.

With reference now to FIG. 5, in accordance with one aspect of the present invention, to overcome the problem of limited opening of the jaws of the collet, the tool bit holder of the present invention employs an expansion insert member 38 and employs an enlarged hollow region 50 in the collet nut interior 24 inside the collet nut at the location of the heads 32 of the collet jaws 30.

More specifically, the collet nut 22 is an integral member having an output shaft engaging end 54 and a tool bit receiving end 56, and having an aperture 58 therethrough. The collet nut 22 has suitable structure for securely engaging to the power tool output shaft 40 of the power tool output shaft, which allows for selective axial displacement of the collet nut 22 relative to the power tool output shaft. In the illustrated and preferred embodiment of the invention, this comprises interior threads 60 adjacent the drive shaft engaging end 54 of the collet nut 22 which are complementary with, and threadably engageable with, exterior threads 62 adjacent the distal end 44 of the power tool output shaft 40, as seen in the sectional views of FIGS. 5–8. In this regard, the rotary output shaft 40 may have a transverse passage 55 for selectively preventing rotation of the output shaft 40 while screwing down the collet nut 22.

The collet nut 22 interior surface defines a first annular bearing surface 66 adjacent the tool receiving end 56 of the collet nut 22, which in the illustrated and preferred embodiment extends at a relatively small angle relative to the central axis of the collet nut 22, such as an angle of approximately 15° from the central axis of the collet nut 22, but which may extend at any suitable angle. The collet nut interior surface defines an adjacent, second annular bearing surface 68 contiguous with the first annular surface 66, which in the illustrated and preferred embodiment extends at a greater angle relative to the central axis of the collet nut 22, such as an angle approximately 30° from the central axis of the collet nut 22, but which may extend at any suitable angle.

Figure 6:
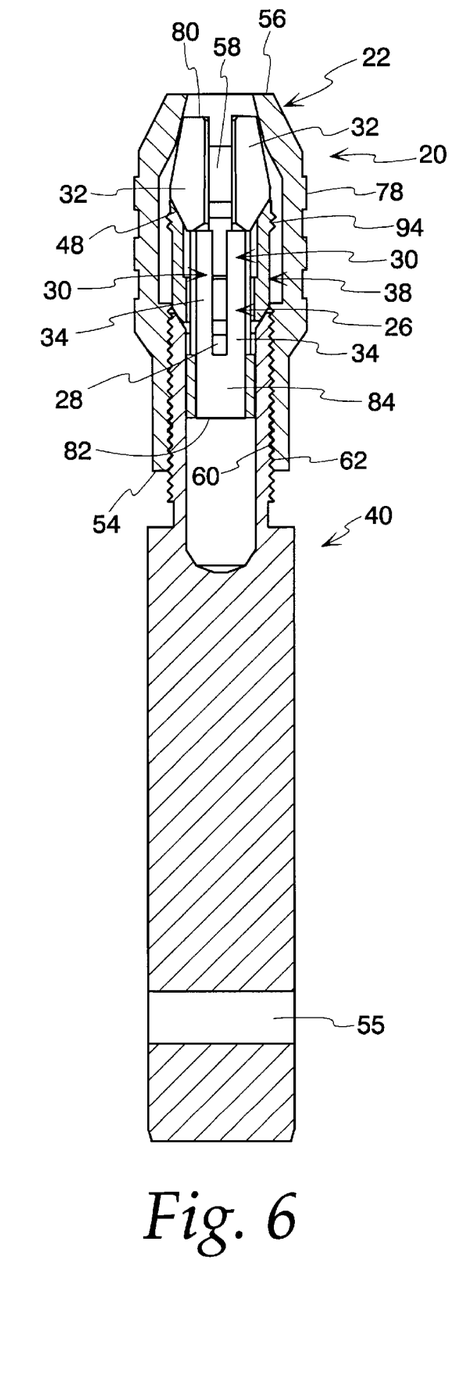
FIG. 6 is a sectional view of the tool holder of FIG. 5, shown with the collet nut threaded further onto the rotary output shaft to partially close the collet from its position illustrated in FIG. 5.

As best seen in comparing FIGS. 5 and 6, the heads 32 of the collet 26 initially bear or cam against the second annular bearing surface 68 of the collet nut upon initial tightening down of the bearing nut 22 down onto the power tool output shaft 40 (see FIG. 5), and the relatively large angle of the second annular bearing surface 68 effects rapid inward movement of the jaws 30 of the collet 26 during this initial tightening down. Hence, less turning of the collet nut 26 is required at this stage to effect the initial drawing together of the jaws 30 than would be required with a more shallow bearing surface angle. When the collet nut 22 is tightened down still further, the heads 32 of the collet 26 then bear or cam against the first annular bearing surface 66 (see FIG. 6), and the relatively small angle of the first annular bearing surface 66 is desirable at this stage of final securing of the tool bit since the shallower angle effects a greater radially inward force than a greater angle, i.e. a greater radial component of the force by the collet nut exerted on the heads 32 of the collet 26, relative to the axial component of this force, is effected.

The illustrated collet nut interior surface further defines a ledge portion 72 which extends outwardly substantially perpendicularly with respect to the central axis at approximately the location at which the interior threads 60 terminate, and the interior surface also defines a vertical wall portion 74 which extends between the outer end of the ledge portion 72 and the second annular surface 68, extending substantially parallel to the collet nut central axis, whereby the collet nut interior 24 has an enlarged hollow region 50 which is wider or larger in diameter than the diameter of the threaded portion at the location at which the collet heads 32 are disposed in the collet nut interior 24. The enlarged hollow region 50 is made sufficiently wide to accommodate the heads 32 of the collet 26 when the jaws 30 are at their most open or separated position.

The exterior surface of the collet nut 22 preferably defines a plurality of integral annular rings 78 having knurls which facilitate gripping of the collet nut for securing and releasing tool bits from the tool holder 20 as described further below, and which also provide additional hoop strength to the collet nut 22 for withstanding the radial forces exerted on the collet nut 22 during its tightening down.

The collet 26 is preferably an integral member having a plurality of slits 28 which extend from the head end 80 and terminate prior to the shank end 82. The slits 28 divide the collet 26 into a plurality of resilient jaw portions 30 integral with one another through a common non-slit portion 84 of the shank 34 adjacent the shank end 82 of the collet 26. In the illustrated embodiment, the slits 28 define four resilient jaws 30, however any number of slits and jaws may be employed. Each jaw 30 has a respective head portion 32 and shank portion 34. The slits 28 are wider in the head portions 32 relative to the width of the slits 28 in the shank portions 34. The relatively wide slits 28 in the head portion 32 of the collet 26 allow for greater movement of the head portions 32 of the jaws 30 between fully open and fully closed positions, whereby the collet 26 can accommodate a significantly greater range of tool bit sizes than collets having more narrow slits. The relatively narrow slits 28 in the shank portion 24 of the collet 26 provide the shank portion 24 of the collet 26 with greater structural integrity and durability as compared to a shank having wider slits.

As best seen in FIGS. 1 and 2 and FIGS. 9 and 10, the head portions 32 of the jaws 30 are generally pie shaped. The inner comer of each of the pie-shaped head portions 32 is machined to form a flat or radius contour 88 suitable for the tool bits to be secured. It is the flats 88 or radius contour of the head portions 32 which bear against the tool bit to secure the tool bit. The flats 88 or radius provide a greater surface area of the jaws 20 in contact with the tool bit than realized with sharp corners not having flats or radii.

Figure 10:
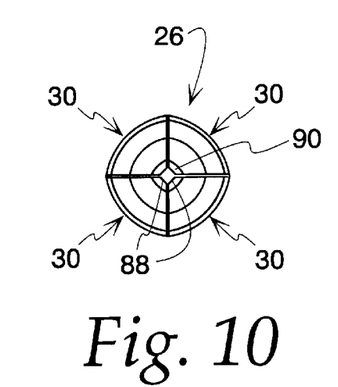
FIG. 10 is an end view of the head end of the collet of FIG. 1 shown in its closed position.

As discussed below, in the preferred embodiment the collet jaws are deflectable such that the entire length of the flats 88 bears against the tool bit upon tightening down of the collet nut, regardless of the size of the diameter of the tool bit being secured. With reference to FIG. 10, the flats 88 or radii leave a small opening in the collet 26 when the jaws 30 are drawn fully together, i.e. to their fully closed position, and define the minimum diameter tool bit which may be secured by the tool holder 20. By way of example, collets have been produced having suitable slit widths and flats or radii such that the collet 26 and, hence the tool holder 20, can accommodate and secure tool bits ranging in diameter from 1/64 inch to 1/8 inch. Manifestly, the invention is not limited in this regard, and suitable collets may be produced which can accommodate and secure different ranges of tool bits, including tool bits of smaller diameter than 1/64 inch and tool bits larger than 1/8 inch.

Additionally, as best seen in FIG. 2, the inner corners of the head portions 32 of the jaws 30, adjacent the head end 80 of the jaws 30, each have small angled flats 90. The angled flats 90 facilitate insertion of a tool bit into the collet jaws 30. If the tool bit is slightly larger than the gap or space defined between the flats 88, such that it contacts the head ends 80 of the jaws 30, the angled flats 90 serve as bearing surfaces against which the leading end of the tool bit bears to force the jaws 30 further apart. In the absence of the provision of the angled flats 90, the leading end of the tool bit would abut the head ends 80 of the jaws 30 without separating the jaws, making insertion of such tool bit significantly more difficult. In the preferred embodiment, the flats 90 extend at a 45° angle and extend approximately 0.040 inch from the top end 80.

Figure 7:
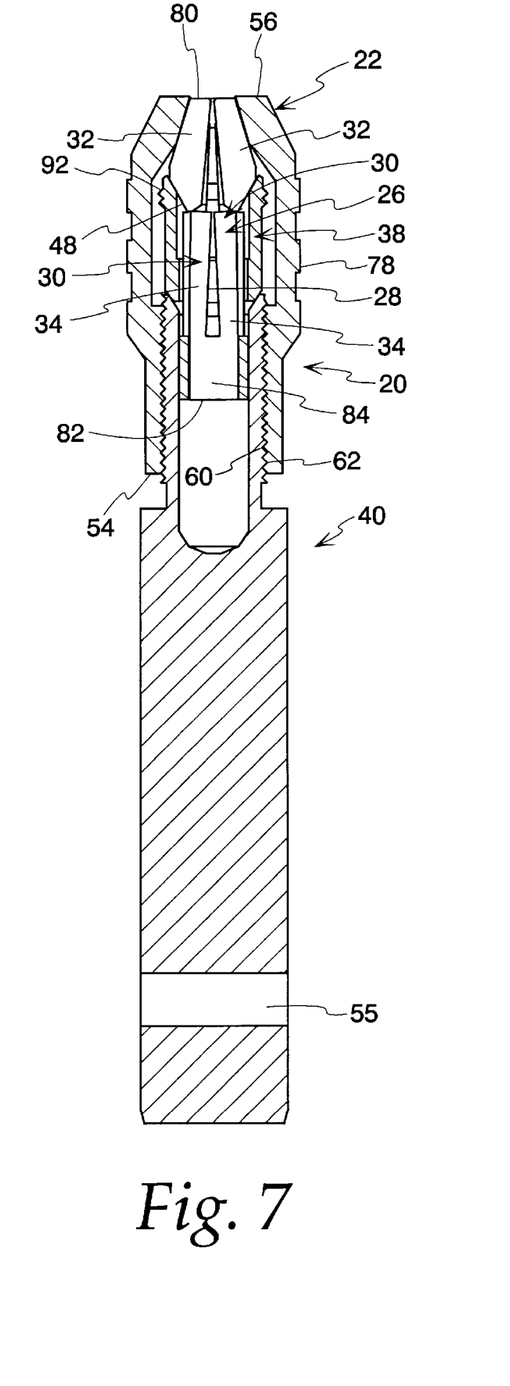
FIG. 7 is a sectional view of the tool holder of FIG. 6, shown with the collet nut threaded still further onto the rotary output shaft in relation to its position illustrated in FIG. 6 to further close the collet.

The outer surfaces of the head portions 32 of the jaws 30 each define an upper camming surface 47 and a lower camming surface 48, with a narrow band 49 therebetween. With reference to FIGS. 5–7, with the tool holder 20 engaged with a power tool output shaft 40, upon tightening down the collet nut 22, the lower camming surfaces 48 of the collet jaws 30 bear against the angled distal end 46 of the expansion insert member 38, and the upper camming surfaces 47 of the collet jaws 30 bear against one of the first bearing surface 66 or second bearing surface 68 of the collet nut 22. This provides closing forces acting on two axially spaced points on the head portions 32 of the collet jaws 30. That is, the collet nut 22 exerts a radially inward force on the upper camming surface portions 47 of the jaws 30, and the expansion insert member 38 exerts a radially inward force on the lower camming surface portion 48 of the jaws 30.

The length of the expansion insert member 38 between its distal end 46 and proximal end 42 is such that substantially only the non-slit end portion 84 of the collet 26 extends into the power tool output shaft 40. The angled distal end 46 of the expansion insert member 38 and the lower bearing surfaces 48 of the collet jaws 30 are preferably complementary and provide bearing engagement therebetween throughout movement of the jaws 30 between their fully open and fully closed positions.

The diameter of the aperture 36 through the expansion insert member is preferably larger over the portion adjacent the distal end 46, and is stepped down in diameter over the portion adjacent the proximal end 42. The narrower diameter of the aperture 36 adjacent the proximal end 42 of the expansion insert member 38 provides improved runout characteristics. The larger diameter portion accommodates the desired outward expansion of the shank portions 34 of the jaws 30. For instance, good runout characteristics were obtained using the tool holder 20 on a power tool output shaft 40 with a 0.172 inch opening with tool bits ranging in diameter from 1/64 inch to 1/8 inch with an expansion insert member 0.248 inch in length and having an aperture 36 diameter of approximately 0.199 inch extending down to approximately 0.190 inch from the distal end 46, with the aperture stepping down to a diameter of approximately 0.171 inch over the remaining 0.058 inch of the expansion member 38 adjacent its proximal end 42.

Figure 8:
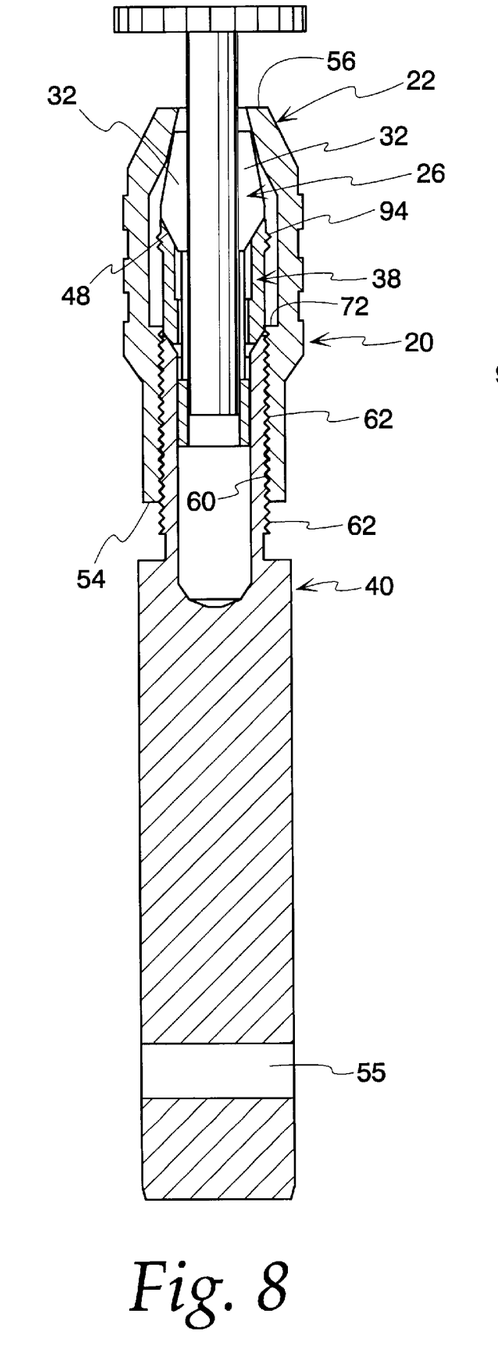
FIG. 8 is a sectional view of the tool holder of FIG. 5, illustrating the ability of the collet jaws to accommodate a tool bit having a relatively large diameter.
Figure 9:
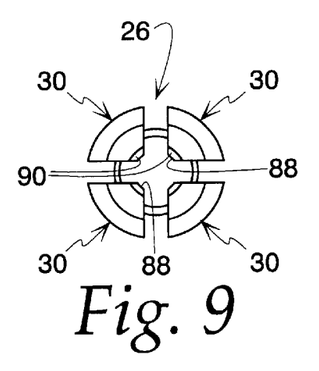
FIG. 9 is an end view of the head end of the collet of FIG. 1 shown in its open position.
Figure 11:
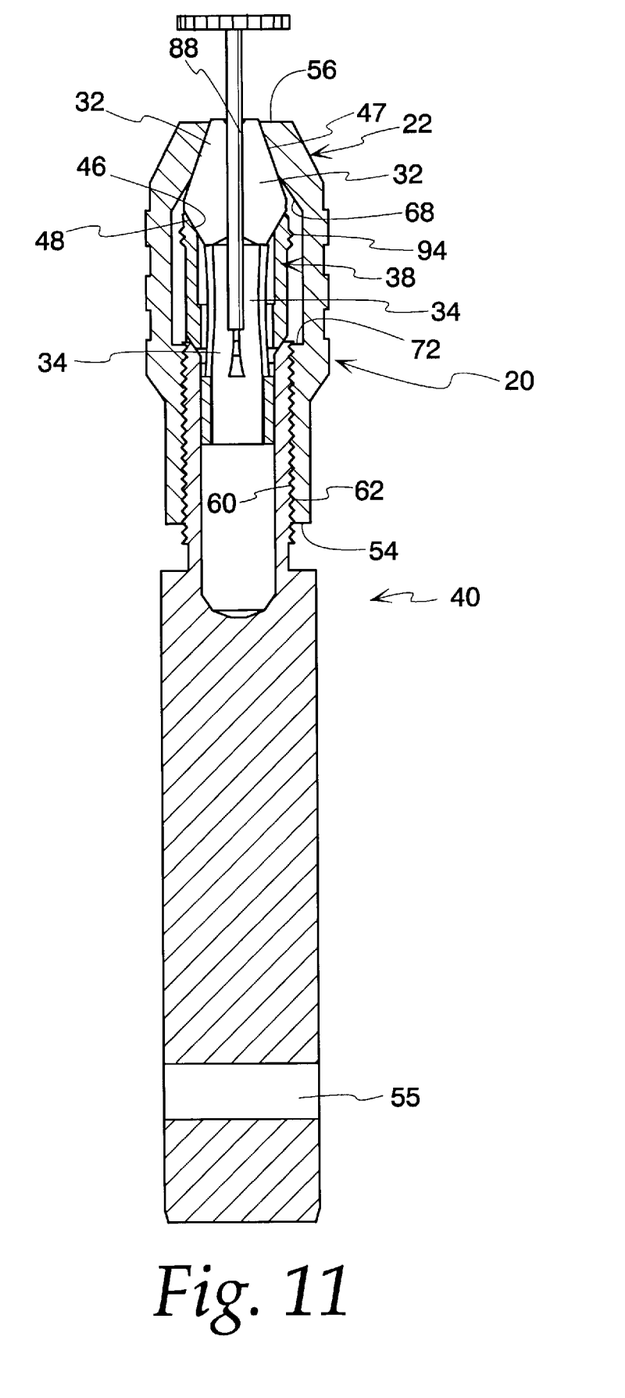
FIG. 11 is a sectional view of the tool holder of FIG. 5, illustrating the inward deflection of the shank portions of the collet with relatively small tool bits.

With reference now to FIGS. 8 and 11, in accordance with another aspect of the tool holder of the present invention, the jaws 30 of the collet 26 are deflectable or resiliently bendable such that the entire length of the flats or radius contour 88 of the jaws 30 bears against the tool bit, regardless of the size of the tool bit, upon tightening down of the collet nut 22. That is, upon screwing down or tightening of the collet nut 22 onto the power tool output shaft 40, the radially inward forces exerted on the lower and upper portions of the jaw head portions 32, respectively, by the end 46 of the insert member 38 bearing against the lower camming surfaces 48, and the first or second bearing surface 66 or 68 bearing against the upper camming surfaces 47, forces the entire length of the flats 88 at the inner end of the jaw head portions 32 to bear against the tool bit. This is achieved by the shank portions 34 of the jaws 30 deflecting under the aforementioned lower and upper radially inward forces applied to the head portions 32 of the jaws 30.

As illustrated in FIG. 11, with a small tool bit, the shank portions 34 deflect inwardly upon the entire length of the flats 88 of the jaw head portions 32 being forced against the tool bit, and thereby being forced into a configuration whereby the flats 88 extend substantially parallel with one another and substantially parallel to the axis of the tool bit. Conversely, with large tool bits, the shank portions 34 deflect outwardly upon the flats 88 being forced parallel to one another about the tool bit. This aspect of the tool bit holder of the present invention provides significantly greater gripping or clamping of the tool bit than prior art devices in which only a portion of the head portions 32 of the jaws 30 bear against those tool bits at the upper and lower ends of the range of bit sizes receivable by the device. The tool bit holder 30 of the present invention assures a good clamping force distributed along the entire length of the flats 88 for all tool bit sizes, such as tool bits ranging in size from 1/64 inch to 1/8 in the preferred and illustrated embodiment of the invention. The flats 88 being forced parallel to one another and gripping the tool bit along substantially the entire length of the flats 88 firmly holds the tool bit straight and thus greatly reduces run out, as compared to currently existing tool bit engaging structures. This has been found to provide significantly improved performance of tool bits used with the tool bit holder of the present invention.

It has also been found that lubrication of the tool bit holder provides greater longevity of the tool bit holder, with significant increase in the number of cycles the tool bit holder can withstand prior to failure being realized with the utilization of lubricant.

As discussed above, it is desirable that the diameter of the aperture 36 through the expansion insert member 38 be larger than the diameter of the opening in the distal end 44 of the power tool output shaft. Thereby, the expansion insert member 38 allows the shank portions 34 of the jaws 30 to move outwardly a greater amount than if the entire shank portion were disposed directly in the smaller diameter opening of the output shaft 40.

Figure 1:
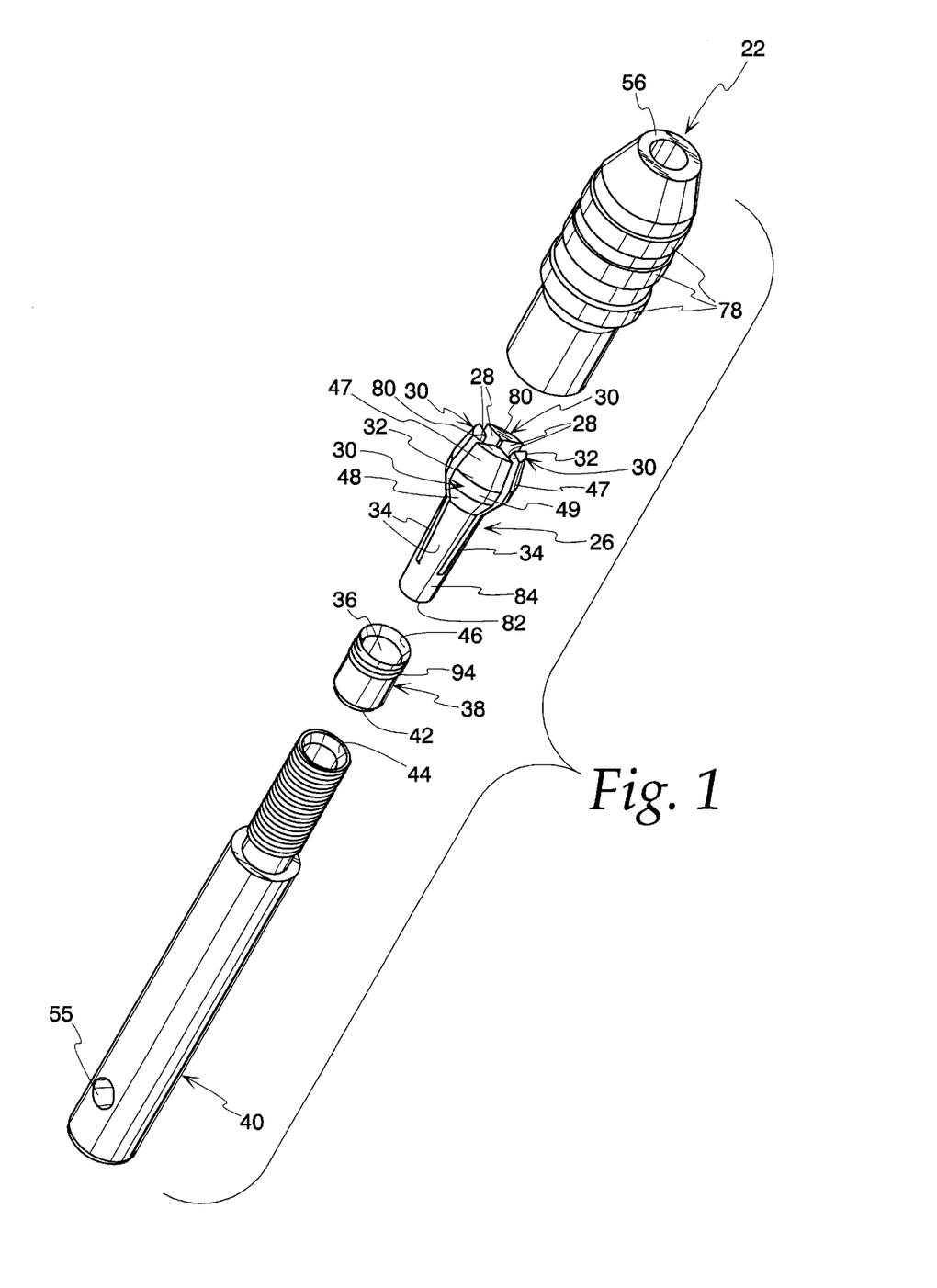
FIG. 1 is an exploded perspective view of a tool bit holder embodying various features of the present invention, shown with a tool output shaft.

As best seen in FIGS. 1 and 2, the proximal end 42 of the expansion insert member 38 is preferably angled to be complementary to the angled distal end 44 of the power tool output shaft 40.

Threads 94 may be provided on the exterior of the expansion insert member 38 adjacent its distal end 46, which threads 94 are complementary with the interior threads 60 on the collet nut 22. After the collet 26 has been inserted into the collet nut 22, the expansion insert member 26 may be threaded into the drive shaft engaging end 54 of the collet nut 26 until the expansion insert member threads 94 are advanced past the ledge 72 at which the collet nut threads 60 terminate, thereby securing the expansion insert member 38 to the collet nut interior, and also thereby securing the collet 26 in the collet nut interior. That is, after the threads 94 of the expansion insert member 38 have been advanced beyond the ledge 72, the application of force on the expansion insert member 38 in the direction of the drive shaft engaging end 54 of the collet nut 22 will not dislodge or separate the expansion insert member 38 from the collet nut interior, with the threads 94 of the expansion insert member 38 bearing against the ledge 72 maintaining the expansion inset member 38 in the collet nut interior, which in turn maintains the collet 26 in the collet nut interior.

Alternatively, and preferably, the expansion insert member 38 is not threaded but rather is heat-shrink fit into the collet nut interior.

Accordingly, with either means for assembly, the user need not be concerned with either the collet 26 or expansion insert member 38 falling out, or becoming separated from, the collet interior, regardless of whether the tool holder 20 is engaged with a power tool output shaft 40 or not.

A particularly advantageous characteristic of the preferred tool holder of the present invention is its ability for retrofitting into existing power tool output shafts. The environment of power tools was utilized herein by way of example only, and it will be readily apparent to those skilled in the art that the tool holder 20 of the present invention is suitable for use with a wide variety of implements and devices, including both power driven and manual tools, and is not limited to power tools.

Accordingly, although the invention has been described herein by way of preferred embodiments, the invention is not limited in this regard, and covers the many modifications and variations which will be apparent to those skilled in the art to which the present invention pertains, all of which may fall within the scope and spirit of the invention as set forth in the accompanying claims.

What is claimed is:

1. A tool bit holder for use with a tool having an output shaft with a proximal end and a distal end, the output shaft having a hollow portion of predetermined diameter adjacent its distal end, and having a threaded portion, the tool bit holder comprising: a collet nut having a threaded portion for threaded engagement with the threaded portion of the tool output shaft, and having a hollow interior at least a portion of which is of greater diameter than the predetermined diameter of the outer diameter of the output shaft, and having an interiorly disposed camming surface; a collet disposed in said hollow interior portion of the collet nut and having a plurality of radially disposed resilient jaws each having a head portion with an interior diameter and a shank portion, with the head portions having a first camming surface for camming engagement with the interiorly disposed camming surface of the collet nut, and the head portions having a second camming surface, and with the shank portions having a common free end which is receivable in said output shaft hollow portion; an annular expansion insert member disposed in said hollow interior of the collet nut and having an aperture through which the shank portions of the collet pass, said insert member aperture having a diameter substantially greater than the outer diameter of the collet shank portion to permit outward flexure of the shank portions, the expansion insert member having a proximal end for bearing against the distal end of the tool output shaft and having a distal end for bearing against the second camming surfaces of the head portions of the collet, said collet nut interior being sufficiently large to permit radial expansion of the collet head portions as bit shanks with larger diameters than the collet head portion interior diameter are inserted into the collet.

2. A tool bit holder in accordance with claim 1 in which the collet has a head end and a shank end, with slits extending from the head end and terminating a predetermined distance from the shank end to define a non-slit portion adjacent the shank end, and the length of the expansion insert member between its proximal and distal ends being such that the expansion insert member limits the extent of insertion of the shank portion of the collet into the output shaft hollow portion to substantially only the non-slit portion of the shank.

3. A tool bit holder in accordance with claim 1 in which the predetermined diameter of the aperture in the expansion insert member is greater than the predetermined diameter of the hollow portion of the drive shaft.

4. A tool bit holder in accordance with claim 1 in which the shank portion of the collet has slots of a first predetermined width between the jaws, and the head portion of the collet has slots of a second, larger predetermined width between jaws.

5. A tool bit holder in accordance with claim 1 in which the jaws accommodate tool bit diameters ranging from approximately 1/64 inch to approximately 1/8 inch.

6. A tool bit holder in accordance with claim 1 in which the head portions of the jaws each have an inner tool-engaging surface and an outer surface, and the hollow interior portion of the collet nut is sufficiently wide at the location at which the head portions of the jaws are disposed to allow opening of the head portions of the jaws an amount which allows receipt of a tool bit having a diameter greater than the diameter of the tool-engaging surfaces of the head portions of the jaws.

7. A tool bit holder in accordance with claim 1 in which the hollow interior of the collet nut is wider than the predetermined diameter of the outer diameter of the drive shaft over that portion of the collet nut at which the head portions of the jaws are disposed.

8. A tool bit holder in accordance with claim 1 in which the collet nut has first and second bearing surfaces which extend at different angles with respect to the central axis of the collet nut and which are engageable with the head portions of the jaws.

9. A tool bit holder in accordance with claim 1 in which the head portions of the collet jaws each have tool bit receiving ends, and at least the inner portions of the tool bit receiving ends are angled to facilitate receipt of a tool bit between the collet jaws.

10. A tool bit holder in accordance with claim 1 in which the head portions of the jaws each have an inn er tool bit engaging surface which bears against the tool bits along substantially the entire length of the inner tool engaging surfaces of the head portions of the jaws.

11. A tool bit holder in accordance with claim 10 in which the head portions of the jaws have an upper region for bearing against the collet nut, and a lower region for bearing against the insert member.

12. A tool bit holder for use with a tool having an output shaft with a proximal end and a distal end, the output shaft having a hollow portion of predetermined diameter adjacent its distal end, and having a threaded portion, the tool bit holder comprising: a collet nut having a threaded portion for threaded engagement with the threaded portion of the tool output shaft, and having a hollow interior at least a portion of which is of greater diameter than the predetermined diameter of the outer diameter of the output shaft, and having an interiorly disposed camming surface; a collet disposed in said hollow interior portion of the collet nut and having a plurality of radially disposed resilient jaws each having a head portion and a shank portion, with the head portions having a first camming surface for camming engagement with the interiorly disposed camming surface of the collet nut, and the head portions having a second camming surface, and with the shank portions having a common free end which is receivable in said output shaft hollow portion; an annular expansion insert member disposed in said hollow interior of the collet nut and having an aperture through which the shank portions of the collet pass, the expansion insert member having a proximal end for bearing against the distal end of the tool output shaft and having a distal end for bearing against the second camming surfaces of the head portions of the collet, including means to transiently attach the insert member with the collet nut to retain the collet in the collet nut.

13. A tool bit holder for use with a tool having an output shaft, comprising: a collet nut having a hollow interior portion and engageable with the tool output shaft; a collet disposed in said collet nut hollow interior portion for receiving a selected tool bit; and an annular expansion insert member having an aperture through which the collet extends, including means to transiently attach the annular expansion insert member in the collet nut hollow interior portion to hold the collet from falling out of the collet nut.

14. A tool bit holder in accordance with claim 13 in which the tool output shaft has a distal end with exterior threads adjacent the distal end, and the collet nut has interior threads for threaded engagement of the collet nut to the tool output shaft.

15. A tool bit holder in accordance with claim 13 in which the tool output shaft has a distal end and the collet has a plurality of resilient jaws each having a bearing surface, and the expansion insert member has a proximal end engageable with the distal end of the tool output shaft and a distal end engageable with the bearing surfaces of the collet jaws.

16. A tool bit holder in accordance with claim 14 in which the proximal end of the expansion insert member is complementary with the distal end of the tool output shaft, and the distal end of the expansion insert member is complementary with the bearing surfaces of the collet jaws.

17. A tool bit holder in accordance with claim 14 in which the jaws each also have a second bearing surface axially spaced from the first bearing surface, and the collet nut has an interior bearing surface engageable with the second bearing surface of the collet jaws.

18. A tool bit holder in accordance with claim 14 in which the collet has slits of a first predetermined width between the head portions and slits of a second, smaller predetermined width between the shank portions.

19. A tool bit holder in accordance with claim 13 in which the collet has a plurality of head portions and shank portions, with the head portions having an upper region for bearing against the collet nut and a lower region for bearing against the expansion insert member.

20. A tool bit holder in accordance with claim 19 in which the head portions have inner tool bit engaging surfaces which are deflectable into engagement with the tool bits of a range of sizes over the entire tool bit engaging surfaces of the head portions.

21. A tool bit holder in accordance with claim 20 in which the tool bits range in size from approximately 1/64 inch to approximately 1/8 inch.

22. A tool bit holder in accordance with claim 19 in which the shank portions deflect inwardly upon deflection of the inner tool bit engaging surfaces into engagement with the tool bit.

23. A tool bit holder in accordance with claim 19 in which the shank portions deflect outwardly upon deflection of the inner tool bit engaging surfaces into engagement with the tool bit.

24. A tool for engaging a selected tool bit, the tool comprising: a tool housing; an output shaft supported by the tool housing having a proximal end and a distal end with the output shaft having a hollow portion of predetermined diameter adjacent its distal end, and having a threaded portion; a collet nut having a threaded portion for threaded engagement with the threaded portion of the tool output shaft, and having a hollow interior at least a portion of which is of greater diameter than the predetermined diameter of the outer diameter of the output shaft, and having a interiorly disposed camming surface; a collet disposed in said hollow interior portion of the collet nut and having a plurality of radially disposed resilient jaws each having a head portion with an interior diameter and a shank portion, with the head portions having a first camming surface for camming engagement with the interiorly disposed camming surface of the collet nut, and the head portions having a second camming surface, and with the shank portions having a common free end which is receivable in said output shaft hollow portion; an annular expansion insert member disposed in said hollow interior of the collet nut and having an aperture through which the shank portions of the collet pass, said insert member aperture having a diameter substantially greater than the outer diameter of the collet shank portion to permit outward flexure of the shank portions, the expansion insert member having a proximal end for bearing against the distal end of the tool output shaft, and having a distal end for bearing against the second camming surfaces of the head portions of the collet, said collet nut interior being sufficiently large to permit radial expansion of the collet head portions as bit shanks with larger diameters than the collet head portion interior diameter are inserted into the collet.

25. A power tool having a collet assembly for securing a wider variety of tool shanks, comprising: a tool body having an output spindle with a threaded distal end, a collet receiving bore in the distal end of the spindle, a collet received in the bore having a distal end with a plurality of radially expandable and contractable jaw portions, and a proximal shank end with a plurality of radially expandable and contractable shank portions, first cam means on the distal end of the spindle for engaging and camming the jaw portions, a collet nut threadedly engaging the spindle distal end and having a second cam means for engaging and camming the jaw portions, and means to accommodate larger diameter tool shanks including a central bore through the collet with a plurality of communicating radial slots extending through the jaw portions and the shank portions, said central bore in the collet being tapered from the distal end of the jaw portions to the proximal end of the jaw portions to permit larger diameter tool shanks to engage the inner surfaces of the jaw portions and spread the jaw portions as the larger diameter tool shanks are inserted into the collet, said collet nut having a hollow interior portion of sufficient diameter to enable the jaw portions to expand as the larger diameter shanks spread the jaw portions upon bit insertion.

26. A one-piece collet for receiving and clamping larger diameter tool shanks, comprising: a one-piece collet member having a central bore therethrough and a plurality of radial slots extending therefrom defining flexible, distal law portions and connected proximal shank portions, said central bore having a tapered portion adjacent the jaw portions with a larger diameter adjacent the distal end of the tapered portion, and a small diameter adjacent the proximal end of the tapered portion, said larger diameter of the tapered bore portion being selected about equal to the largest diameter tool shank usable with the collet to engage upon insertion into the tapered bore portion and cause the jaw portions to spread outwardly, said radial slots adjacent the jaw portions and the shank portions being sized to cause the jaw portions after spreading to clamp into parallel contact with the largest diameter tool shank and to permit the shank portions to bow outwardly to accommodate the parallel contact of the jaw portions with the largest diameter tool shank.

* * * * *